(12) United States Patent
Williams

(10) Patent No.: US 6,729,840 B2
(45) Date of Patent: May 4, 2004

(54) HYDROELECTRIC POWERPLANT

(76) Inventor: Herbert L. Williams, 109 Rivers Edge Dr., E. Palatka, FL (US) 32131

( * ) Notice: Subject to any disclaimer, the term of this patent is extended or adjusted under 35 U.S.C. 154(b) by 0 days.

(21) Appl. No.: 10/068,802

(22) Filed: Feb. 6, 2002

(65) Prior Publication Data

US 2004/0013510 A1 Jan. 22, 2004

Related U.S. Application Data

(60) Provisional application No. 60/267,078, filed on Feb. 6, 2001.

(51) Int. Cl.⁷ .................................................. F03B 3/04
(52) U.S. Cl. ........................ 415/3.1; 415/4.3; 415/91; 415/906; 415/908; 416/198 R
(58) Field of Search ............................ 415/3.1, 4.3, 4.5, 415/2.1, 91, 13.1, 906, 908; 416/189, 198 R; 290/42, 43, 53, 54

(56) References Cited

U.S. PATENT DOCUMENTS 4,163,904 A * 8/1979 Skendrovic .................. 290/54
5,592,816 A * 1/1997 Williams ..................... 60/398

\* cited by examiner

*Primary Examiner*—Edward K. Look
*Assistant Examiner*—Dwayne J. White

(57) ABSTRACT

A powerplant for use in high head applications (dams) which allows marine animals (fish, otters, turtles, etc.) to swim safely from one side of the dam to the other. The turbine blades which take energy from the water to produce electricity have a large hole through their center. They are arranged one behind the other in such a way that the velocity of the water is decreased as it passes through each blade. The large holes through the center of the turbine blades and the decreasing of the water flow, while increasing the amount of energy produced, will allow marine life to easily swim back and forth through the dam.

12 Claims, 2 Drawing Sheets front view front view

HYDROELECTRIC POWERPLANT

CROSS-REFERENCE TO RELATED APPLICATIONS

This application claims the benefit of provisional application No. 60/267,078 filed Feb. 6, 2001.

STATEMENT REGARDING FEDERALLY SPONSORED RESEARCH OR DEVELOPMENT

"Not applicable"

REFERENCE TO A MICROFICHE APPENDIX

"Not applicable"

BACKGROUND OF THE INVENTION

The invention is a machine for producing electricity from a water current while allowing marine animals (fish, otters, turtles, etc.) to swim freely through its center. A provisional application 60/267,078 filing date Feb. 6, 2001 has been filed. Its application would be in dams and other areas where existing hydroelectric turbines are detrimental to or completely stop migration of fish from one side of the dam to the other.

Existing turbine designs such as the "minimum gap runner" by Voith Siemens and Alden Research's "fish friendly" turbine only address smolt or small hatchlings in their journey downstream through the turbines. Even with a survivability rate of between 90 to 98%, if 2 to 10% are injured or killed at each dam and there are 6 to 10 dams in the system, it still involves a high mortality rate.

Studies have shown that when fish swim through a pipe, they have a tendency to swim in the center of the pipe. With its open center, this machine could have a survivability rate of 100% both directions while increasing power output and reducing downstream turbulence.

BRIEF SUMMARY OF THE INVENTION

The machine is a fish friendly (both directions) hydroelectric turbine to replace existing turbines in dams and to be the turbine of choice for new and proposed dams.

The invention is a cylindrical fixed housing with numerous counter rotating open center blades in its interior. As the water reaches each blade, part is routed through the blades while part passes unrestricted through the blades center open area. The part that flows through the blade causes rotation of the blade. The part that flows through the open area in the center of the blade causes a friction pull on the part flowing through the blade and has an end result of pulling against the back side of the blade which produces additional rotational energy and efficiency in the blade. This process happens repeatedly at each blade in the turbine. The net result is a slowing of the water velocity at each blade while power is being produced. The number of blades necessary to obtain a target flow velocity (one needed for fish migration) usually from 3 to 10 knots would be determined by the head pressure of the dam divided by the flow reduction of each blade.

Two prototype turbines, a 9' and a 9½' diameter blade, have been tested in the St John's river in Florida by Florida Hydro Power and Light Co., with very positive results. A scuba diver could easily swim through the machine while at full power with no harm being done.

Although both prototypes 1 and 2 were designed and tested for low head applications, the data received from each of them suggests the open center blade is more powerful (efficient) than existing turbine blades.

It is possible if not likely, that the machine, when applied to a high head application could be 100% fish friendly while producing more power than the existing turbines they replace. The harmful pressure changes, supersaturation of oxygen and other gases, disorientation and predation will also be reduced since the turbine creates very little turbulence.

1 is the open area through its center.

2 is the inner rim of the blade.

3 is the blade.

4 is the outer rim of the blade. (2, 3 and 4 are fixed together and rotate as one unit)

5 is the inner lining of the housing.

6 is the outer lining of the housing. (5 and 6 are fixed together and make the housing).

Figure 2:
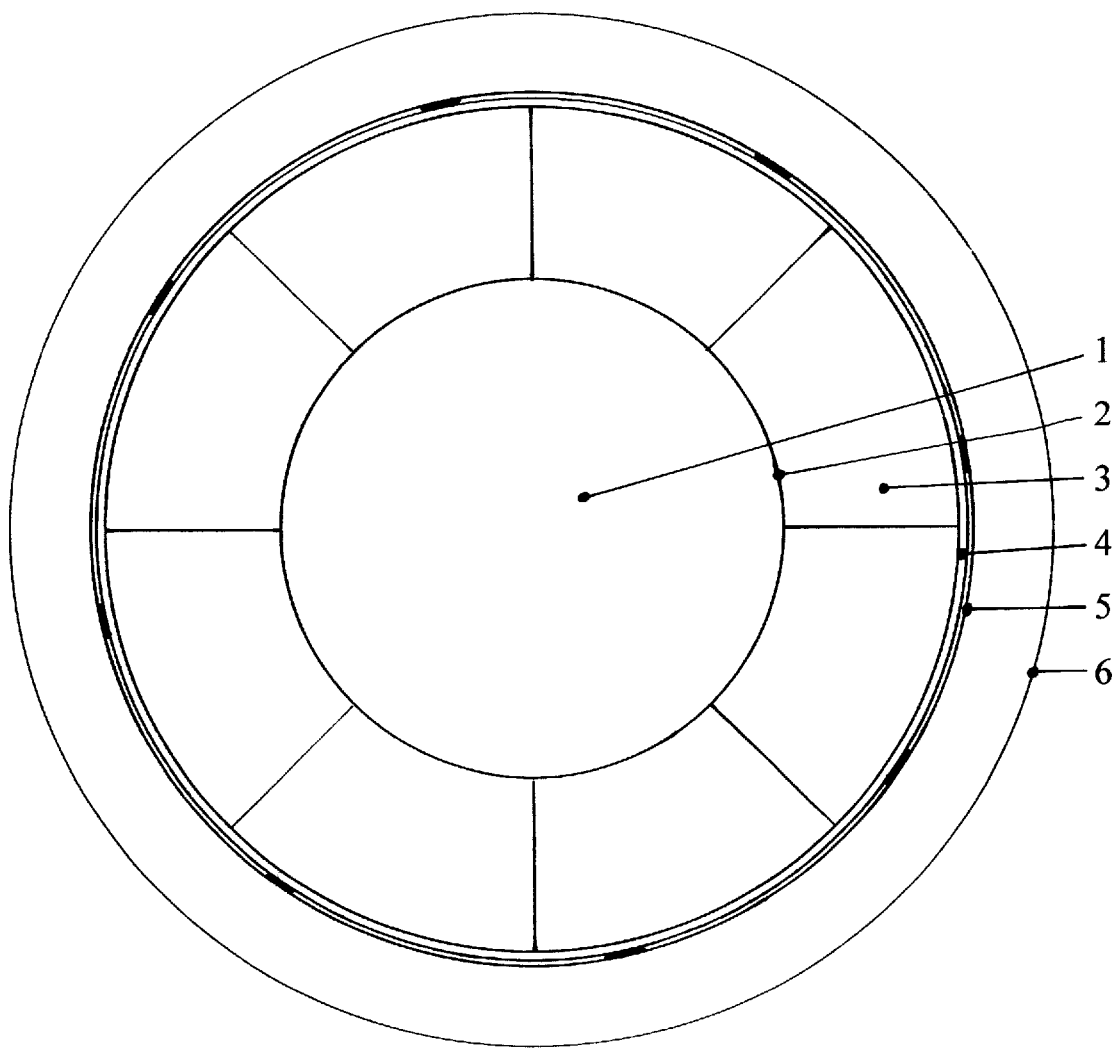

FIG. 2 is a side view (cross-section) taken at the center line of the machine.

Figure 1:
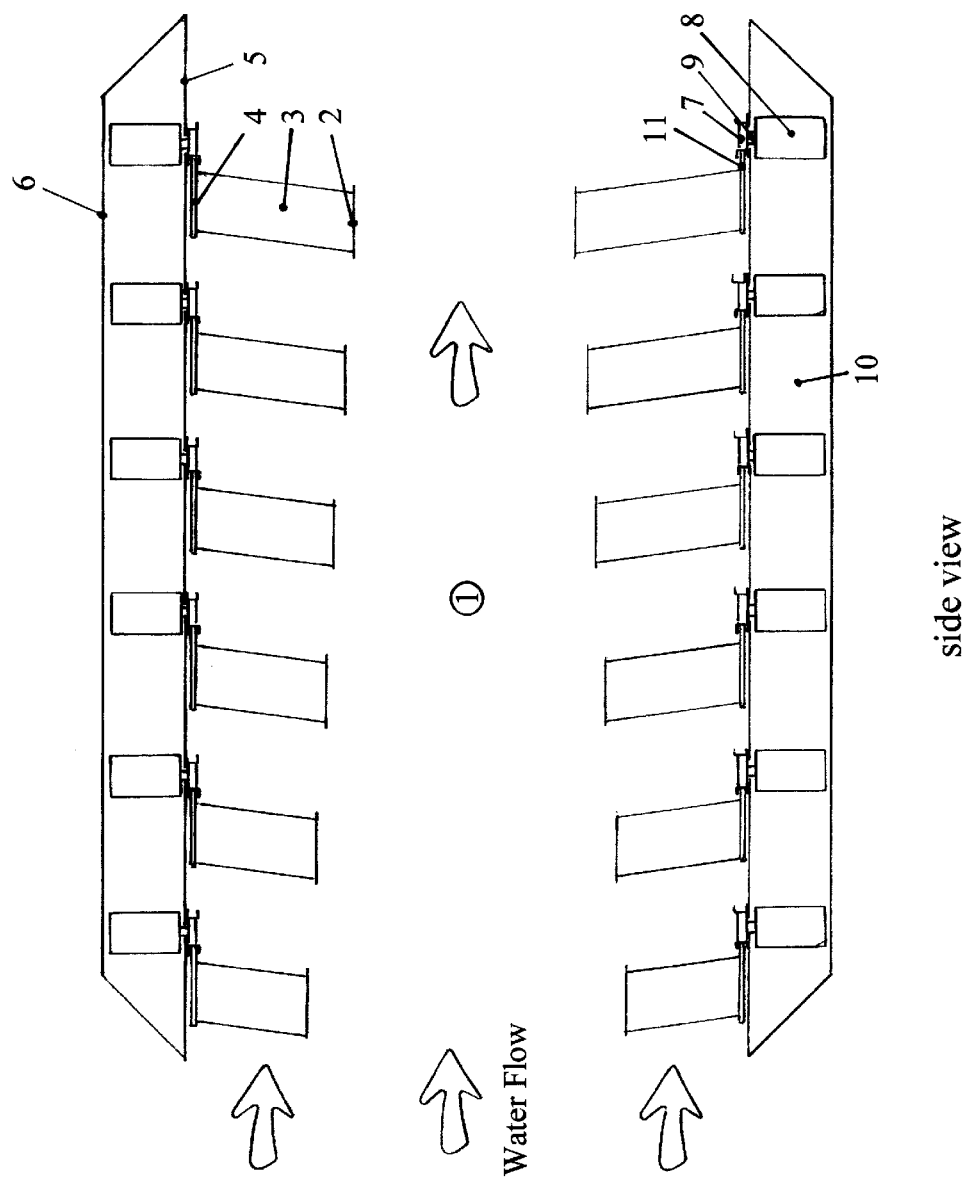
FIG. 1 is a front view of the turbine (as seen from upstream) containing.

(1 through 6 are described in FIG. 1)

7 is a geared rubber encased wheel.

8 can either be a gear driven D.C. generator or a hydraulic pump to supply energy to turn an A.C. generator.

9 is the shaft that mechanically connects 7 and 8 together.

10 is the space between lining 5 and lining 6.

11 is the notched downstream edge of outer rim 4.

DETAILED DESCRIPTION OF THE INVENTION

The turbine housing (inner lining 5 and outer lining 6) is attached to a dam in such a manner that the water flow will be directed through the inner lining 5 and will equalize with the water pressure in space 10. As the water flows into the lining 5, it is divided by the rim 2 so that part of the flow is routed through the blade 3 while the remaining part flows through the open center 1. The velocity of the part flowing through the blade 3 is reduced as power is taken from it to turn the blade 3. The velocity from the part of the water flowing through the open center 1 is not reduced until it again joins with the part flowing through the blade 3 and is past the inner rim 2. When the flow joins together downstream of the blade, the velocities of each part of the flow will equalize thereby increasing the velocity of the part coming through the blade 3 while decreasing the velocity of the part coming through the open center 1. Three things are accomplished when the water equalizes downstream of the blades 3. (1) The water downstream the blade 3 is pulled faster by the higher velocity coming through the open area 1 in the center, thereby increasing the rotational speed of the blade 3. (2) The higher velocity water passing through the open center 1 is slowed by the slower velocity water coming through the blade 3 thereby reducing the total flow of water through the turbine respectively. (3) Downstream turbulence is reduced each time the water equalizes downstream the blade 3. As each turbine blade 3 takes rotational energy from the water flow, a net reduction in water velocity will occur. The combination of each of these drops in velocity will result in a total drop in velocity equal to the target velocity needed for fish migration. Each blade 3 can be independently regulated as to the amount of energy taken from the blade.

The combination of energy taken at each blade 3 will equal the total energy capacity of the turbine unit. The higher the head pressure of the dam, the more blades 3 would be required to achieve target velocity and power output. Since each blade 3 is independent from the other blades, power output and rotational speed can be adjusted individually with each blade. If for example, a desired target exit velocity was 5 knots and available head was 30 knots, the 25 knot velocity reduction could be achieved by taking 5 knots per turbine blade and having 5 blades or 2 knots per blade and having 13 blades, etc.

The downstream edge 11 of outer rim 4 is notched so that the rotational energy of the rim 4 can be transferred to the geared rubber encased wheels 7 which are mechanically connected to the shaft 9 which either turns a D.C. generator or a hydraulic pump.

As the water flows through the blades, it causes them to rotate which also causes rotation of (1) gear driven D.C. generators or (2) hydraulic pumps. In the case of (1) gear driven D.C. generators, the D.C. electricity would be routed through inverters to the grid. In the case of (2) hydraulic pumps, fluid under pressure would be routed to hydraulic motors which turn an A.C. generator (or generators) to produce A.C. electricity for the grid.

What I claim as my invention is:

1. A turbine having no central shaft comprising a plurality of open center turbine blades sets having outer and inner rims surrounding said turbine blade sets, said housing having an inner lining and an outer lining enclosing a plurality of D.C. generators or hydraulic pumps: said plurality of D.C. generators or hydraulic pumps being mechanically driven by each of said turbine blade sets, wherein said stationary housing is which rotate within a stationary housing which is mechanically attached to a dam.

2. A turbine of claim 1 whose stationary housing allows the water pressure inside the housing to equalize with the pressure in the vicinity of its blades.

3. A turbine having no central shaft comprising a plurality of open center turbine blade sets having outer and inner rims surrounding said turbine blades sets, said housing having inner lining and an outer lining enclosing a plurality of D.C. generators or hydraulic pumps: said plurality of D.C. generators or hydraulic pumps being mechanically driven by each of said turbine blade sets, wherein said stationary housing is mechanically attached to a dam; wherein said plurality of open centered blade sets are being rotated independently of each other.

4. A turbine of claim 3 which is attached to a dam and reduces downstream turbulence through the use of a plurality of open centered blades.

5. A turbine having no central shaft comprising a plurality of open center turbine blade sets having outer and inner rims surrounding said turbine blades sets, said housing having inner lining and an outer lining enclosing a plurality of D.C. generators or hydraulic pumps; said plurality of D.C. generators or hydraulic pumps being mechanically driven by each of said turbine blade sets, wherein said stationary housing is mechanically attached to a dam; wherein plurality of open center blade sets regulate flow velocity.

6. A method of allowing fish passage both directions through the turbine of claim 5 by reducing flow velocity.

7. A method of reducing flow velocity through the turbine of claim 5 by independently regulating the amount of rotational energy taken from each of the turbine blade sets.

8. A method of reducing downstream turbulence of claim 5 by the use of a plurality of open center blade sets.

9. A method of increasing the rotational energy of a turbine blade of claim 5 by allowing unrestricted water to flow through the open center area of the blade.

10. A method of increasing the velocity of the water on the back side of a turbine blade of claim 5 by allowing an unrestricted flow of water through the blades open center.

11. A method of allowing an unrestricted flow of water through the center of a turbine blade of claim 5 to increase the efficiency of the blade.

12. A method of taking energy from the downstream edge of a turbine blades outer rim of claim 5 to produce electricity.

\* \* \* \* \*